United States Patent [19]

Alofs

[11] Patent Number: 4,466,477
[45] Date of Patent: Aug. 21, 1984

[54] DIE CASTING MACHINE WITH STRAIN GAUGE

[75] Inventor: Wayne J. Alofs, Holland, Mich.

[73] Assignee: Prince Corporation, Holland, Mich.

[21] Appl. No.: 332,965

[22] Filed: Dec. 21, 1981

[51] Int. Cl.³ .............................................. B22D 17/32
[52] U.S. Cl. ....................................... 164/150; 164/312
[58] Field of Search .................. 164/4.1, 150, 151, 154, 164/303, 312; 73/761, 855

[56] References Cited

U.S. PATENT DOCUMENTS

| | | | |
|---|---|---|---|
| 3,212,325 | 10/1965 | Katz et al. | 73/855 |
| 3,433,290 | 3/1969 | Eggenberger et al. | 164/303 |
| 3,467,054 | 9/1969 | Bowden et al. | 116/114 |
| 3,519,096 | 7/1970 | Lunzer | 177/225 |
| 3,776,031 | 12/1973 | Trigg | 73/95 |
| 3,943,819 | 3/1976 | Charron | |
| 4,067,234 | 1/1978 | Seney | 73/144 |

FOREIGN PATENT DOCUMENTS 131059  10/1981  Japan ................................. 164/312

*Primary Examiner*—Kuang Y. Lin
*Attorney, Agent, or Firm*—Price, Heneveld, Huizenga & Cooper

[57] ABSTRACT

A strain gauge arrangement for die casing machines of the type having tie bars with threaded ends, comprises an unthreaded, uniform intermediate portion on at least one of the tie bars, which defines a measuring region with interior and exterior ends. An elongate aperture extends through the end of the one tie bar, and terminates at a base that defines the interior end of the measuring region. A detector rod is telescopingly received in the aperture, and has its inner end resiliently urged into continuous contact with the base of the aperture. A sleeve is slidingly received over the outer end of the detector rod, and has its inner end resiliently urged into continuous contact with a shoulder which defines the exterior end of the measuring region. A measuring device detects changes in the relative position of the outer ends of the detector rod and the sleeve to determine strain in the measuring region of the one tie bar.

9 Claims, 3 Drawing Figures

4,466,477

DIE CASTING MACHINE WITH STRAIN GAUGE

BACKGROUND OF THE INVENTION

The present invention relates to die casting machines of the type having threaded tie bars, and in particular to a strain gauge arrangement therefor.

Die casting machines typically include four main tie bars which retain the various parts of the die casting machine together during injection of the die. During die injection, the tie bars are tensed severely, thereby causing longitudinal elongation or strain in the tie bars within elastic limits. It is preferred that the four tie bars be uniformly strained, so that the die halves are held squarely together during the locking and injection sequence.

In one type of die casting machine, such as that disclosed in U.S. Pat. No. 3,547,184, the ends of the tie bars are threaded to facilitate adjusting the same to insure uniform tensioning. It is very difficult to accurately determine the strain in tie bars which have threaded ends, since the length of that portion of the rod under tension is not constant, but varies as the mating adjustment nuts are tightened and loosened. Hence, the tension or stress in each of the tie rods must be recalculated each time the tie rods are adjusted. This is a time consuming and tedious task that is particularly difficult to carry out under manufacturing conditions.

SUMMARY OF THE INVENTION

One aspect of the present invention is a strain gauge arrangement which is particularly adapted for die casting machines of the type having tie bars with a threaded end. The strain gauge comprises providing at least one of the tie bars with an elongated bore extending along and generally coaxially with the longitudinal axis of the end tie bar. The bore has an open end and a closed end (base) which is located longitudinally inwardly beyond the threads, the location of the closed end or base defining the interior end of the measuring region. A stepped shoulder also located longitudinally inwardly of the threads is formed in the bore of the tie bar and defines the exterior end of the measuring region. A detector rod is telescopingly received into the bore. It has an inner end shaped for abutment with the base of the bore, and another end protruding outwardly therefrom. Means are provided for resiliently biasing the inner end of the detector rod continuously against the base. A reference sleeve is slidingly received over the detector rod, and has an outer end and an inner end which is shaped for abutment with the tie bar shoulder. The inner end of the sleeve is continuously biased against the shoulder, so that both the detector rod and the sleeve are attached to the tie rod in a non-rigid, floating arrangement. A measuring device detects changes in the relative position of the outer end of the detector rod and the outer end of the sleeve to determine the elongation and thus the strain on the measuring region of the tie bar, and thereby accurately ascertain tensile loading therein.

The principal objects of the present invention are to provide a strain gauge arrangement which is specifically designed for use in conjunction with die casting machines having threaded tie bars. The strain gauge accurately measures total elongation of a preselected, measuring region of the tie bar, thereby eliminating the effects of any irregular stretching which takes place in non-uniform or threaded portions of the rod, and also eliminates those variables experienced heretofore when the bar adjustment nuts are manipulated. The strain gauge provides a continous reading, which is clear and easy to interpret. The construction of the present strain gauge arrangement is quite uncomplicated, and is therefore very durable and reliable. The present strain gauge provides a mechanism by which the strain on the tie bars on the tie bars can be easily and quickly be determined, and then be adjusted to equalize tension therein. The present invention is quite efficient, relatively easy and exonomical to manufacture, capable of a long operating life, and particularly well adapted for the proposed use.

These and other features, advantages and objects of the present invention will be further understood and appreciated by those skilled in the art by reference to the following written specification, claims and appended drawings.

BRIEF DESCRIPTION OF THE DRAWINGS

FIG. 3 is a fragementary, vertical cross-sectional view of the strain gauge illustrated in FIG. 2, wherein the tie bar is shown in a tensed condition.

DETAILED DESCRIPTION OF THE PREFERRED EMBODIMENTS

Figure 1:
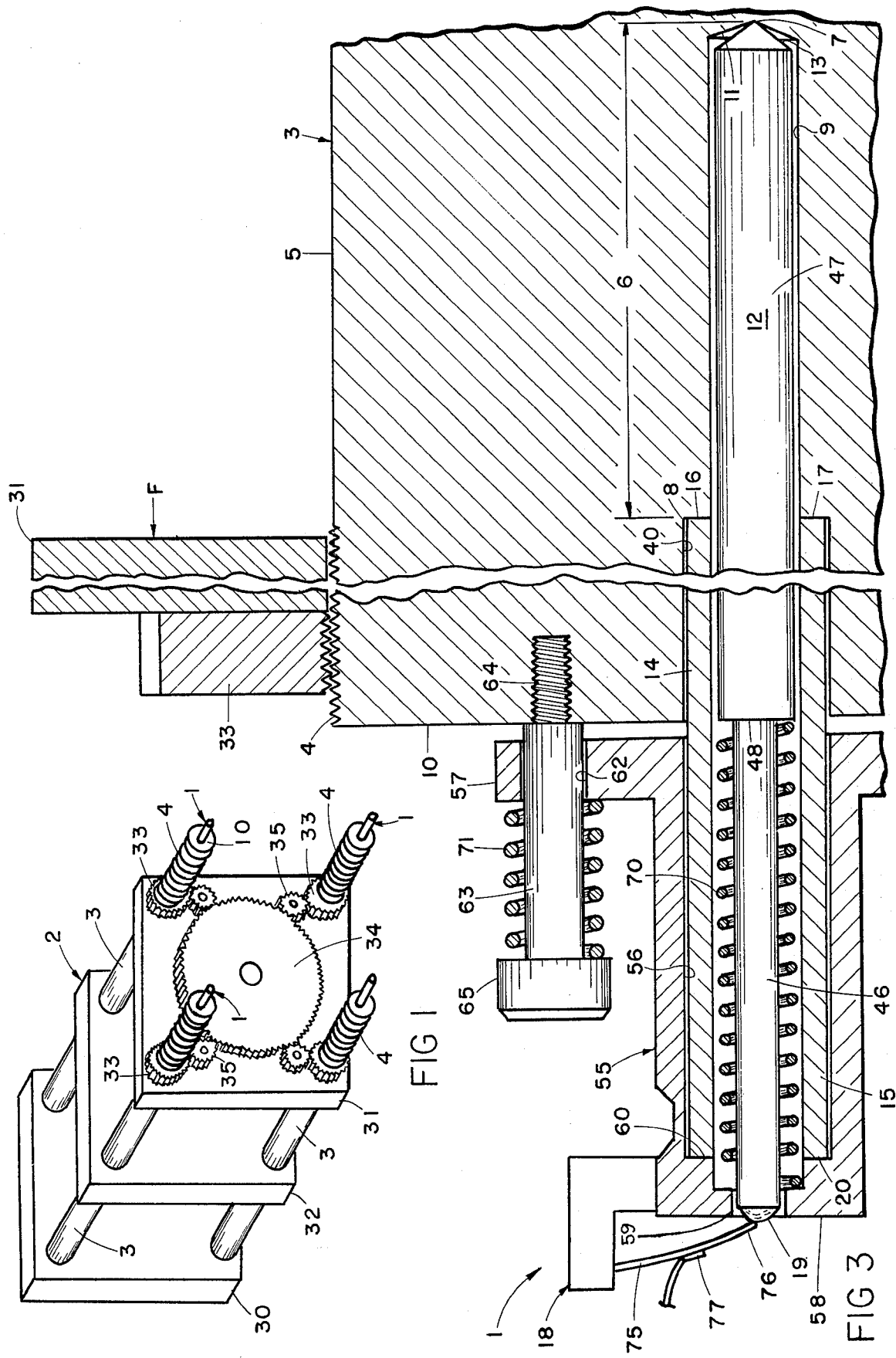
FIG. 1 is a partially schematic perspective view of a die casting machine, with a strain gauge embodying the present invention connected with each of the threaded tie bars.
Figure 2:
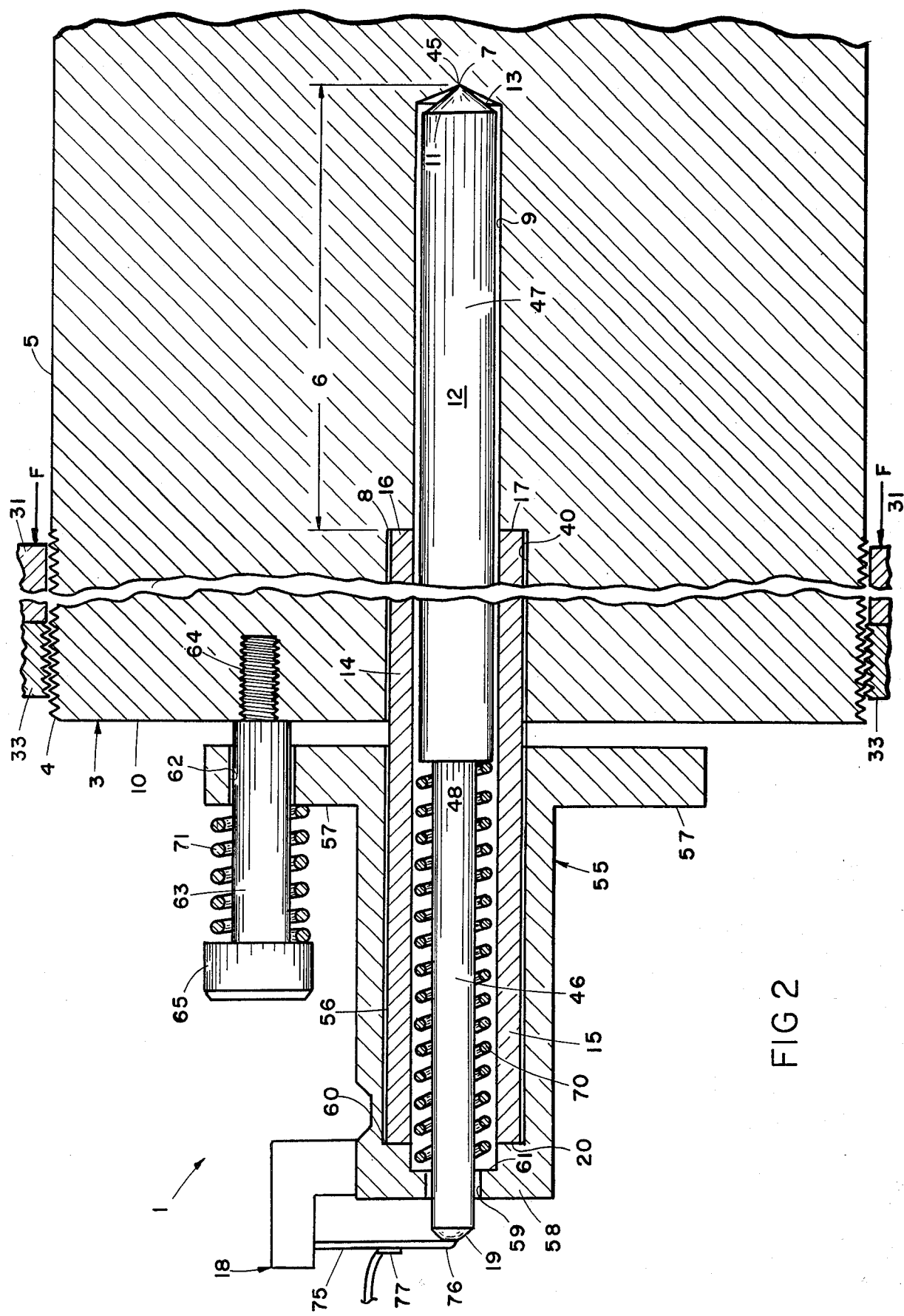
FIG. 2 is a fragmentary vertical cross-sectional view of one of the strain gauges, shown attached to a tie bar which is not under tension.

For purposes of description herein, the terms "upper," "lower," "right," "left," "rear," "vertical," "horizontal," and derivitives thereof shall relate to the invention as oriented in FIGS. 1 and 2. However, it is to be understood that the invention may assume various alternative orientations, except where expressly specified to the contrary.

Referring to FIG. 1, there is shown in pictorial form a die casting machine 2 incorporating the present invention, which involves in combination with the die casting machine, a strain gauge assembly 1 which will be explained in greater detail hereinafter. The die casting machine 2 includes a front stationary platen 30, a rear stationary plate 31, and a movable platen 32 positioned between the front platen and the rear plate, and slidably movable on tie bars 3. On the rearward facing surface of front platen 30 there is attached one-half of a die (not shown), while the corresponding, mating half of the die is mounted on the front surface of the movable platen 32. The tie bars 3 are secured at one end of the front platen 30, and at the opposite end to the rear plate 31 by means of a threaded connection.

The die casting machine 2 also includes a hydraulic ram and a toggle linkage (not shown) coupled between the rear plate 31 and the movable platen 32 for advancing the movable platen into a locked-up casting position with the die closed, and for retracting movable platen 32 away from the stationary platen 30 for opening the die to remove the cast part. The die casting machine 2 is of the same general type as that disclosed in U.S. Pat. No. 3,407,685, issured Oct. 29, 1978, to E. D. Prince, and U.S. Pat. No. 4,256,166 issued Mar. 17, 1981, to E. D. Prince, both patents being assigned to the present assignee. The difference between the present die casting machine 1 and that of said patents is that the threaded ends of the tie bars 3 which are connected to the rear plate 31 are formed by threaded sleeves and collars as described, whereas in the present invention, the threaded ends 4 are an integral part of the tie bar. Nevertheless, the remaining disclosure of these two patents is incorporated herein by reference.

It should be understood that in the operation of die casting machine 2, when the movable platen 32 is moved into the closed position and molten metal is injected into the die, the force exerted on the movable platen 32 is transmitted through the toggle mechanism (not shown) to the platen 30 and plate 31, which places the tie bars 3 in tension. It is important that this tension be constant for each of the tie bars 3 and, as a result, adjustment nuts 33 are provided for each of the tie bars. The adjustment of the nuts 33 varies the pressure imposed upon the die halves and, therefore, it is desirable that a means for determining the tension on each of the tie bars be provided.

In practicing the invention of U.S. Pat. No. 4,256,166, a tension measuring device is especially desirable in order that this information can be used for adjusting the adjustment nuts 33. The means for adjusting the adjusting nuts 33 is by a bull gear 34 engaging a plurality of idler gears 35 that in turn engage the adjustment nuts 33. In some die casting machines, the bull gear adjusts the tension on the tie rods simultaneously. In accordance with the invention of U.S. Pat. No. 4,256,166, the adjustment of the adjustment nuts is selective and automatic as determined by the measuring of the tension in the tie bars separately, and using this information to adjust each of the adjustment nuts, both separately and selectively. This invention relates, therefore, primarily to the combination of a die casting machine and the strain gauge assembly 1 for measuring the tension of each of the tie bars 3.

FIGS. 2 and 3 best illustrate the strain gauge assembly 1, it being understood that FIG. 2 discloses the assembly when the tie bar is not under tension, and FIG. 3 discloses the assembly when the tie bar is under tension. In accordance with my invention, the strain gauge assembly 1 measures only the elongation of a section of the unthreaded, uniform medial portion 5 (FIGS. 2 and 3) of tie bar 3. In other words, portion 5 does not include threaded end 4 because the elongation of any threaded portion is not the same as the remainder of the tie bar. Further, it is important that tie bar portion 5 is located forwardly of the attachment of the tie bars to back plate 31.

To illustrate my invention, reference numeral 6 designates the measuring region, the elongation of which is measured in the manner described hereinafter. Boundaries of this region constitute the innermost boundary 7 and the outermost boundary 8. Having determined the boundaries over which the elongation is measured, an aperture or bore 9 is provided through the end face 10 of tie bar 3 so as to terminate at a base 11 which defines the innermost boundary 7 of the measuring region 6. Also, an enlarged bore 40 concentric with bore 9 extends from the end face 10 to a shoulder 17.

Indicator rod 12 is telescopingly received in bore 9. It includes an inner end 13, which is resiliently urged by spring 70 into continuous contact with the base 11 of bore 9. A reference sleeve 14 is slidingly received over an exterior portion of detector rod 12 and is located in the bore 40 with the inner ends 16 resiliently urged by springs 71, as will be described, into continuous contact with the shoulder 17. A measuring device 18 is provided at the end of the rod 12 and the sleeve 14 for detecting changes in the relative position of the outer end 19 of detector rod 12 and the outer end 20 of sleeve 14. Such changes in the relative position of rod 12 and sleeve 14 determines the elongation of the measuring region 6 of tie bar 3 created by the placing of tension of the tie bar 3. Accordingly, the strain in the measuring region 6 and the uniform tensile loading in the tie bars 3 can be determined as will be described hereinafter.

Preferably, each of the four tie bars 3 of die casting machine 2 is equiped with one of the present strain gauges, as shown in FIG. 3. In this manner, the strain in each tie bar 3 can be simultaneously determined, and the individual retainers 33 can be adjusted to obtain uniform strain in the tie bars to insure proper alignment between the mating die halves. Since the strain gauges 1 are identical in construction, reference shall be made herein only to the strain gauge illustrated in FIGS. 1 and 2 to simplify the present description.

The measuring region 6 (FIGS. 2 and 3) of tie bar 3 has a substantially uniform transverse cross-sectional shape along its entire length, and is preferably constructed of a homogenous material, such that tension in the tie bar will elongate the same evenly along the measuring region. Preferably, the measuring region 6 of the tie bar 3 is disposed immediately adjacent to the threaded end 4 of the tie bar, so as to minimize the depth required for aperture 9.

Bore 9 extends coaxially along the longitudinal axis of tie bar 3, and has a diameter which is relatively small in comparison to the diameter of tie bar 3 so as to minimize any weakening in the overall strength of tie bar 3. In this example, bore 9 has a generally cylindrical shape with a frustoconically shaped bottom defined by base 11, which is designed for purposes to be described in greater detail hereinafter. The shoulder portion 17 formed at the juncture of bores 40 and 9 is positioned inwardly of the threaded end 4 of tie bar 3, and defines the exterior end 8 of the measuring region 6.

Detector rod 12 is telecopingly received within bore 9, and in this example comprises a rigid, generally cylindrically shaped rod having a pointed tip 45 in the shape of a cone which mates with the recess in base 11 to retain detector rod 12 coaxially within bore 9. The outwardly disposed portion 46 of detector rod 12 has a smaller diameter than the inwardly disposed portion 47, thereby forming a shoulder 48 therebetween. The outer end 19 of detector rod 12 is rounded to facilitate engagement with measuring device 18. Detector rod 12 is preferably constructed of a lubricant impregnated steel having an antifriction outer surface to insure accurate measurement.

Reference sleeve 14 is rigid, and has an annular transverse cross-sectional shape, with an exterior surface contoured for close reception in the enlarged bore 40. The inside diameter of sleeve 14 is shaped for sliding reception over the inward portion 47 of detector rod 12. The inner end 16 of sleeve 14 abuts against tie rod shoulder 17, and the outer end 15 of sleeve 14 protrudes outwardly from bore 40. The illustrated sleeve 14 has a substantially uniform transverse cross-sectional shape, and is preferably constructed from a strong, non-corroding material, such as stainless steel, or the like. Sleeve 14 is sized so that it can translate freely in the longitudinal direction both in bore 40 and over detector rod 12.

Both detector rod 12 and sleeve 14 are resiliently urged inwardly into abutting contact with their associated portions of tie bar 3, whereby the same are mounted to tie bar 3 in a non-rigid, floating arrangement. In this example, a cylindrically shaped housing 55 is provided, and includes an interior cavity 56 in which the exterior portion of sleeve 14 is closely received. Housing 55 includes a ring-shaped collar 57 at the open end of the housing, and a closed end 58 with a central aperture 59 through which the outer end 19 of detector rod 12 is slidingly received and generally protrudes. The interior side of housing end 58 includes a first shoulder 60 against which the outer end 20 of sleeve 14 abuts, and a second shoulder 61 for purposes to be described in greater detail hereinafter. The collar portion or flange 57 of housing 55 includes at least one aperture 62 disposed substantially parallel with the longitudinal axis of aperture 9. A pin 63 is received through each collar aperture 62, and is anchored to the end face 10 of tie bar 3. In this example, pin 63 comprises a shoulder screw, having its threaded end 64 mounted in tie bar 3, and an enlarged outer end or head 65. Housing 55 is free to slide longitudinally along pin 63 toward and away from the end face 10 of tie bar 3. In a like manner, sleeve 14 and detector rod 12 are free to slidingly reciprocate in the longitudinal direction. Preferably, housing 55 is mounted on tie bar 3 by four such pins 63, which extend though mating apertures in collar 57.

A first coil spring 70 resiliently urges or biases detector rod 12 inwardly to maintain rod tip 13 in constant engagement with the base 11 of aperture 9. Coil spring 70 is mounted on the outward portion 46 of detector rod 12, and extends between shoulder 61 of housing 55, and shoulder 48 on detector rod 12. A second coil spring 71 is positioned on each pin 63, and extends between the collar 57 of housing 55, and the head 65 of the associated pin 63. Preferably, springs 70 and 71 are pretensed when the tie bars 3 are not under tension, such that when stress is applied to the tie bars 3, and elastically elongates the same, springs 70 and 71 will continuously bias both detector rod 12 and sleeve 14 inwardly, or to the right as oriented in FIGS. 1 and 2. Coil spring 71 is preferably much stiffer than coil spring 70 to insure that housing shoulder 60 constantly maintains contact with the outer end 20 of sleeve 14.

Measuring device 18 contemplates substantially any instrument which is capable of detecting relative movement between detector rod 12 and sleeve 14, such as a transducer, a mechanical dial gauge, or the like. In this example, measuring device 18 comprises a strain gauge mounted on the outer end of housing 55, comprising a semi-rigid detector arm 75 extending laterally therefrom, with the free end 76 of arm 75 engaging the rounded end 19 of detector rod 12. Detector arm 75 is in the nature of a leaf spring which is pretensed to maintain engagement with detector rod 12, and includes a wire strain gauge 77, or other similar device bonded thereto to measure the deflection of arm 75.

OPERATION

In operation strain gauge assembly 1 operates in the following manner. When the mating die halves in die casting machine 2 are closed, and the die is being injected during the shot stroke, a counteracting force F (FIG. 3) is exerted against rear plate 31 and front platen 30 causing very high tensile forces to be developed in each of the tie bars 3 to resist separation of the mating die halves. These tension forces elastically elongate or strain each of the tie bars 3. FIG. 2 illustrates the tie bar in a substantially untensed condition. When the tie bars are tensed, as shown in FIG. 3, the measuring region 6 of each tie bar 3 is elongated, and detector rod 12 moves inwardly, or to the right as oriented in FIGS. 2 and 3, under the urging of springs 70 and 71. The translation of detector rod 12 inwardly reflects that elongation which takes place in the tie bar between the base 11 of aperture 9, and the lock point of the threaded end 4 of the tie bar 3 at which the tie bar is mounted or attached to the front plate 30 of the die casting machine 2 by retainer 33. Since this distance varies with the adjustment of adjustment nuts 33, and may experience non-uniform strain due to the threads, it is beneficial to eliminate the effect of any elongation in the threaded portion of the tie bar which is outside of the measuring region 6. For this reason, sleeve 14 is provided. As the tie rod is tensed, sleeve 14 also moves inwardly, or to the right as oriented in FIGS. 2 and 3, along with housing 55 by coil spring 71, and reflects that elongation which takes place in the tie bar between the exterior end 8 of measuring region 6 (e.g., shoulder 17), and the lock point on the tie bar end 4. Since that portion of tie bar 3 between the lock point and end face 10 is not stressed, there is no corresponding strain or elongation. Hence, the total elongation or strain experienced in the measuring region 6 of the die par 3 can be easily detected by measuring the relative movement between sleeve 14 and detector rod 12.

In this example, this difference in motion is detected by measuring device 18. Detector arm 75 bends or deflects with the movement of detector rod 12, and the strain in arm 75 resulting by this bending is measured by gauge 77. This reading can then be used to determine the stress in each of tie bars 3. Preferably, adjustment nuts 33 are individually rotated to adjust the length of its respective tie bar 3, and thereby equalize the tension in each of the tie bars in accordance with the readings obtained from the four gauges 1.

In a like manner, when tension is removed from tie bar 3, the length of the measuring region 6 is decreased, thereby translating detector rod 12 outwardly, or to the left as illustrated in FIGS. 2 and 3, thereby returning the detector arm 75 to its initial position.

The floating mounting arrangement of strain gauge 1 provides a very uncomplicated construction which can be economically manufactured, and also accurately determines tensile loading in the tie bars 3 to insure uniform stress therein.

In the foregoing description it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a die casting machine of the type having a front stationary platen and a rear plate with tie bars connected therebetween; a movable platen slidably mounted on said tie bars between said front platen and said rear plate; means between said rear plate and said movable platen for advancing said movable platen, whereby tensile force is created in said tie bars when molten metal is injected into a die located between said front platen and said movable platen; and a strain gauge assembly for determining the strain exerted on at least one of said tie bars, comprising:

an elongated bore disposed in a first end of said one tie bar, and extending along and generally coaxially with the longitudinal axis thereof; said bore extending into a measuring region located between said movable platen and the connection of said one tie bar to one of said front platen and said rear plate; said bore having one end thereof opening through the first end of said one tie bar, and the other end closed at a base which defines an innermost boundary end of said measuring region;

a stepped shoulder formed in the bore of said one tie bar; said stepped shoulder being located between said movable platen and the connection of said one tie bar to said one of said front platen and said rear plate, and defining the outermost boundary end of said measuring region;

a detector rod telescopingly received in said bore, so as to be free to reciprocate slidingly in said bore; said rod having an inner end abutting said base, and an outer end;

a sleeve slidingly received over said detector rod; said sleeve having an inner end abutting said shoulder, and an outer end; said sleeve being freely translatable in the longitudinal direction both in said bore and over said detector rod;

a housing telescopingly received over an exterior portion of said sleeve, and having a shoulder portion thereof in abutting contact with the outer end of said sleeve;

a first spring having one end thereof connected with said detector rod and the other end connected with said housing whereby said detector rod is biased continuously against said bore base;

a collar extending from said housing disposed adjacent to and spaced apart from the first end of said one tie bar, said collar including an aperture extending therethrough;

a pin anchored to the first end of said one tie bar extending through said aperture, said pin including an enlarged head;

a second spring mounted on said pin pretensed between said collar and the head of said pin whereby the inner end of said sleeve is biased continuously against said shoulder; and measuring means for measuring the change in the relative position between the outer end of said detector rod and the outer end of said sleeve, said measuring means being connected to said housing and said rod, whereby the elongation of said measuring region can be detected by the movement of said detector rod relative to said sleeve.

2. In a die casting machine of the type having a front stationary platen and a rear plate with tie bars connected therebetween; a movable platen slidably mounted on said tie bars between said front platen and said rear plate; means between said rear plate and said movable platen for advancing said movable platen, whereby tensile force is created in said tie bars when molten metal is injected into a die located bateen said front platen and said movable platen; and a strain gauge assembly for determining the strain exerted on at least one of said tie bars, comprising:

an elongated bore disposed in a first end of said one tie bar, and extending along and generally coaxially with the longitudinal axis thereof; said bore extending into a measuring region located between said movable platen and the connection of said one tie bar to one of said front platen and said rear plate; said bore having one end thereof opening through the first end of said one tie bar, and the other end closed at a base which defines an innermost boundary end of said measuring region;

a stepped shoulder formed in the bore of said one tie bar; said stepped shoulder being located between said movable platen and the connection of said one tie bar to said one of said front platen and said rear plate, and defining the outermost boundary end of said measuring region;

a detector rod telescopingly received in said bore, so as to be free to reciprocate slidingly in said bore; said rod having an inner end abutting said base, and an outer end;

a sleeve slidingly received over said detector rod; said sleeve having an inner end abutting said shoulder, and an outer end; said sleeve being freely translatable in the longitudinal direction both in said bore and over said detector rod;

a housing telescopingly received over an exterior portion of said sleeve, and having a shoulder portion thereof in abutting contact with the outer end of said sleeve;

a first spring having one end thereof connected with said detector rod and the other end connected with said housing whereby said detector rod is biased continuously against said bore base;

a collar extending from said housing disposed adjacent to and spaced apart from the first end of said one tie bar, said collar including an aperture extending therethrough;

a pin anchored to the first end of said one tie bar extending through said aperture, said pin including an enlarged head;

a second spring mounted on said pin pretensed between said collar and the head of said pin whereby the inner end of said sleeve is biased continuously against said shoulder; and measuring means including a semi-rigid detector arm having one end mounted on said housing and the other end abutting the outer end of said detector rod and a wire strain gauge bonded to said detector arm.

3. A die casting machine as set forth in claim 2, wherein:

said detector rod includes a shoulder formed on an exterior portion thereof; and said first named spring is mounted on the exterior portion of said detector rod, and is pretensed between said rod shoulder and the apertured end wall of said housing.

4. A die casting machine as set forth in claim 3, wherein:

the inner end of said detector rod has a pointed tip to insure point contact with said base.

5. A die casting maching as set forth in claim 4, wherein:

said base has a conical recess in which said rod tip is received to insure coaxial alignment between said detector rod and said bore.

6. A die casting machine as set forth in claim 5, wherein:

said detector rod has an antifriction outer surface for smooth, sliding reciprocation in said sleeve.

7. A die casting machine as set forth in claim 6, wherein:

said measuring region is disposed immediately adjacent to the threads on the first end of said one tie bar.

8. A die casting machine as set forth in claim 7, wherein: each of said tie bars has a strain gauge assembly associated therewith.

9. A die casting machine as set forth in claim 8, wherein: the first end of said one tie bar extends through said rear plate and includes an adjustment nut attached thereto on the exterior side of said rear plate.

* * * * *